United States Patent
Grozea et al.

(10) Patent No.: US 11,248,510 B2
(45) Date of Patent: Feb. 15, 2022

(54) CONNECTION HEAD WITH A RETURN CAVITY

(71) Applicant: TE Connectivity Norge AS, Blomsterdalen (NO)

(72) Inventors: Ion Grozea, Sandsli (NO); Girish Chebbi, Rådal (NO)

(73) Assignee: TE CONNECTIVITY NORGE AS, Blomsterdalen (NO)

( * ) Notice: Subject to any disclaimer, the term of this patent is extended or adjusted under 35 U.S.C. 154(b) by 0 days.

(21) Appl. No.: 16/439,657

(22) Filed: Jun. 12, 2019

(65) Prior Publication Data
US 2019/0383195 A1 Dec. 19, 2019

(30) Foreign Application Priority Data
Jun. 13, 2018 (EP) .................................. 18177521

(51) Int. Cl.
| | | |
|---|---|---|
| *F01N 3/10* | (2006.01) | |
| *F01N 11/00* | (2006.01) | |
| *F01N 3/20* | (2006.01) | |
| *H01R 13/66* | (2006.01) | |
| *B01D 53/94* | (2006.01) | |
| *G01F 23/30* | (2006.01) | |

(52) U.S. Cl.
CPC .......... *F01N 11/00* (2013.01); *B01D 53/9431* (2013.01); *F01N 3/2066* (2013.01); *H01R 13/6683* (2013.01); *F01N 2570/14* (2013.01); *F01N 2900/1814* (2013.01); *F01N 2900/1818* (2013.01); *G01F 23/30* (2013.01)

(58) Field of Classification Search
CPC ..... F01N 2610/1406; F01N 2610/1473; F01N 11/00; F01N 2900/1818; F01N 2900/1814; F01N 2610/14; H01R 13/6683
USPC ........................................................... 60/301
See application file for complete search history.

(56) References Cited

U.S. PATENT DOCUMENTS

| | | | | |
|---|---|---|---|---|
| 2009/0188923 | A1* | 7/2009 | Versaw, Jr. | ........ F02M 37/0082 220/564 |
| 2014/0026990 | A1* | 1/2014 | Delihas | ................... F01N 3/035 137/558 |
| 2014/0283933 | A1* | 9/2014 | Andvik | ................... F01N 3/208 137/561 A |
| 2014/0331650 | A1* | 11/2014 | Yang | .................. B01D 53/9495 60/277 |
| 2015/0089996 | A1* | 4/2015 | Reimer | .................. G01N 29/02 73/19.03 |
| 2015/0337708 | A1* | 11/2015 | Schlenke | .............. F01N 3/2066 73/61.59 |
| 2017/0122170 | A1* | 5/2017 | Fahrenkrug | ........ B01D 35/0276 |
| 2017/0189837 | A1* | 7/2017 | Herold | .............. B01D 35/0276 |
| 2018/0016957 | A1* | 1/2018 | Woods | .................. F01N 3/2066 |
| 2019/0136807 | A1* | 5/2019 | Leger | ................. F02M 37/0017 |
| 2020/0232840 | A1* | 7/2020 | Gismervik | .............. G01F 23/72 |

FOREIGN PATENT DOCUMENTS

WO WO-2016027941 A1 * 2/2016 ............. F01N 11/00

* cited by examiner

Primary Examiner — Jason D Shanske (57) ABSTRACT

A connection head for being arranged in an orifice of a fluid tank with a return cavity in the form of a radial duct is provided. The return cavity overcomes the problems of the formation of air bubbles in the tank and enhances the functioning of the sensor in the tank.

14 Claims, 7 Drawing Sheets

CONNECTION HEAD WITH A RETURN CAVITY

CROSS REFERENCE TO COPENDING PATENT APPLICATION

This patent application claims priority to European Patent Application No. 18177521.4 filed on Jun. 13, 2018, which application is hereby incorporated by reference in its entirety.

FIELD

The present invention relates to a connection head for being arranged in an orifice of a fluid tank and to a fluid sensor, for instance, a urea sensor comprising such a connection head. Further, the present invention relates to a selective catalytic reduction (SCR) system for purification of harmful NOx components in the exhaust gases of diesel vehicles.

BACKGROUND

Fluid property sensors are widely used in vehicles. For example, they are used to sense the level of fluids like the fuel level in a fuel tank, or more recently the level and/or quality of urea in a urea tank. This fluid, for example, Diesel Exhaust Fluid (DEF) or Adblue, is employed for reduction systems for reducing harmful NOx components in the exhaust gases of Diesel engines. To achieve an efficient reduction of NOx in exhaust gas, it is important to analyze the quality of the urea solution and their level inside the tank.

To realize a level measurement for instance, a bank of reed switches provided on a printed circuit board are aligned one beside the other, and are positioned inside a tube, e.g. made of polypropylene. A magnetic float surrounds the tube, and depending on its position on the urea solution, will lead to the switching of a corresponding switch.

Besides the level measurement, further properties of the solution can be sensed as well, e.g. the temperature, the concentration or presence of bubbles and the like.

The sensors are often integrated in a tube mounted to a connection head incorporated in the opening of the tank. The connection head typically contains openings for further tubes. First, a tube is needed to suck the fluid out of the tank to the place where it reacts with the NOx components. Second, a further tube is required to return fluid that has been sucked out, but not been used for the reduction process back into the tank. Third, as urea freezes at −10°, a heating means is needed to heat urea in case of low ambient temperatures. The heating means usually has a heating coil comprising a single tube. This heating coil is usually connected to the cooling fluid circuit of the vehicle.

The tube for measuring the fluid level usually is fabricated from stainless steel, with its inner wall comprising of a tube consisting of plastic such as polypropylene. The interior of the tube contains a printed circuit board (PCB) all along the length of the tube. The printed circuit is connected to a power line and a ground of a vehicle, e.g. a truck, and via two wires to a CAN bus of the truck. The PCB comprises of reed switches, which interact with a magnetic ring-shaped float around the tube that has a perpendicular orientation, and the float moving up and down with the fluid level. Via its magnetic field, it interacts with the reed switches, which then give a signal to the CAN bus.

An example of a conventional fluid property sensor is described in WO 2016/027941 A1, wherein the device for measuring urea concentration, and the device measuring the urea concentration of urea water used in a selective catalytic reduction system is presented. The device for measuring urea concentration is disposed in a urea water tank storing urea water. The device for measuring urea concentration is provided with an ultrasonic transceiver, and a shielding member surrounding a concentration measurement area propagated by ultrasonic waves of the ultrasonic transceiver. The shielding member has a plurality of through-holes, and the through-holes prevent bubbles in the urea water from invading into the concentration measurement area, but allow the urea water to inflow into the concentration measurement area.

Sensors for further properties of the solution comprising a temperature sensor, as well as an ultrasound emitter and sensor for measuring the concentration and quality of urea, are typically located at the lower end of the fluid level sensor at the bottom of the tank. These sensors are, like the fluid level sensor, connected to the PCB, and, hence, to the power line, the ground, and the CAN bus of the truck.

Not only the fluid level tube with its interior electronics, but also the other metal tubes, the ones for sucking fluid out and returning fluid back in, and for heating the fluid, need to be grounded, in order to avoid electrolysis in the fluid. In earlier systems, the grounding was provided via connecting each of the tubes with the grounding connection via a wire. This solution has the disadvantage that the wires can break.

Therefore, there is still a need to provide a connection head, a fluid sensor, and an SCR system with a reliable electrical connection between electrically conductive tubes and ground potential, which can be fabricated economically at the same time being robust even in challenging application environments.

Further, the conventional connection heads for urea sensors are cumbersome in design and could not be employed in challenging scenarios. Thus, there is a need for a connection head that reduces the number of the tubes connected to the connection head.

In many applications, such as in combustion engines, the fluid is pumped from the tank to a consumer device, such as the combustion engine. In order to secure a sufficient supply of fluid to the consumer device at all times, more fluid is pumped to the consumer device than is actually needed. Excessive fluid, which is not consumed, is discharged back into the tank.

Often, the tank is provided with a sensor device, which may be used for determining fluid quantity and/or fluid quality. The proper functioning of the sensor device may be impaired by the presence of air bubbles in the stream. The air bubbles may be introduced by the excessive fluid which is led back to the tank.

SUMMARY

The present invention solves the problems identified above in the conventional devices for measuring urea concentration. The return cavity of the present invention is designed so that excess fluid is discharged back into the tank at the rim of the connection head. This has the effect of reducing the formation of air bubbles in the tank and thereby, the functioning of the sensor in the tank is not impaired.

This object is solved by the subject matter of the independent claims. Advantageous embodiments of the present invention are the subject matter of the dependent claims.

The present invention is based on the idea that the connection head is provided with a return cavity, which may in particular replace a tube to return fluid that has been sucked out, but not been used for the reduction process back into the tank. Advantageously, the return cavity may be replaced with a duct that may be partly integrated into the base of the head connector, such that it is almost completely surrounded by the isolating material of the base.

Further, the return cavity according to the present invention shortens the return tube, and dispenses away with the requirements of bushings, heat brackets, screws and nuts.

In particular, the present invention relates to a connection head being arranged in an orifice of a fluid tank. The connection head comprises an electrically insulated base, wherein the base is provided with at least a first opening for receiving a first electrically conductive tube, and at least a first electrically conductive grounding element with at least a first receptacle, wherein the first electrically conductive grounding element is arranged such that the first electrically conductive tube is electrically connected to the first grounding element. According to the present invention, the first grounding element is electrically connected to a first region of a first electrically conductive grounding lead, and the base comprises an electrically insulating material. The first grounding lead, being integrated within the base such as to be at least partly surrounded by the insulating material of the base, and wherein a second region of the first grounding lead, is connectable to ground potential.

The grounding element and the integrated grounding lead form a safe and robust means for grounding the tube, and have the additional advantage of providing an economical assembly. Advantageously, the grounding element and the grounding lead are formed as separate metal parts. It is, however, clear for a person skilled in the art that the two parts may also be fabricated integrally as one single part.

For a particularly easy assembly of the connection head and the tube, the first receptacle of the first grounding element is aligned with the first opening of the base to encompass said conductive tube. Such an alignment of the receptacle and the opening can be provided for some or all tubes if a plurality of tubes is provided.

According to an advantageous embodiment of the present invention, the first grounding lead is over molded by said insulating material. This technique allows for a particularly robust and stable connection of the tube to ground. In case more than one grounding lead is provided, some or all of the grounding leads may be over molded by said insulating material. Furthermore, the grounding leads may be interconnected as a lead frame. Preferably, the first and/or second grounding lead comprises a stamped and bent metal sheet.

For instance, when using the present invention with a connection head of a urea sensor in an SCR system, a first electrically conductive tube may be the tube for returning fluid back into the tank. Another tube is required for forming the heating coil, and a third tube for sucking fluid out of the tank.

Therefore, the present invention also relates to a connection head as described above with a return cavity, wherein the base is provided with at least one second opening for receiving a second electrically conductive tube. According to this embodiment, a second electrically conductive grounding element is provided, which has at least a second receptacle, wherein the second electrically conductive grounding element is arranged such that the second electrically conductive tube is electrically connected to the second grounding element, and wherein the second grounding element is electrically connected to a first region of a second electrically conductive grounding lead, and wherein the base comprises an electrically insulating material, the second grounding lead being integrated within the base such as to be at least partly surrounded by the insulating material of the base, and wherein a second region of the second grounding lead is connectable to ground potential.

For instance, in case of a urea sensor in an SCR system, the heating fluid inlet and the DEF outlet may be connected to one common grounding element, whereas the heating fluid outlet and the DEF inlet are connected to the second, separate grounding element. However, it is clear for a person skilled in the art, that the first and second grounding element may also be formed as one single, integrated element, for instance as one metal plate. A particularly firm connection between the base and the grounding element(s) can be achieved when forming the first and/or the second grounding element comprises a metal plate and fixing same to the base by a plurality of screws.

For providing an electrical connection from the second ends of the first and second grounding leads to the grounding, a screw and a wire may be provided. Any other suitable connection means such as press-fit pins or riveted bolts, may also be used.

In one embodiment of the invention, the base further comprises an electrical connector for electrically contacting at least one fluid sensor assembly. For instance, the connector is connected to a grounding and a power line of an electric circuit via wires, and the connector is also connected to a CAN bus via two wires, wherein all the wires are protected by a cover. The cover has the advantage that the wires are protected against mechanical damage.

The connection head according to the present invention is advantageously used with a fluid sensor, further comprising at least one fluid quality sensor unit, which is distanced apart from the connection head for being arranged inside the fluid tank. For instance, the connection head is configured to be residing in the opening of a tank, a first metal tube residing inside the tank with its first end being accommodated in the first receptacle of the connection head, and its second end being open such that the interior of the first metal tube and the interior of the tank are connected. This tube may be relatively short, and its opening could be close to the top of the tank. This tube would be appropriate for sucking fluid back from the tank. The return cavity according to the present invention is suitable for returning fluid back into the tank. Moreover, a second electrically conductive tube may be formed by a heating tube with its first end being accommodated in the second receptacle of the connection head, and its second end being accommodated in the fourth receptacle of the connection head, and the second metal tube forming a loop with part of the loop forming a coil. This is the tube for heating the fluid. The coil shape has the advantage that it renders the interface between the heating tube and the fluid particularly large.

The fluid sensor may further comprise a third metal tube residing inside the tank with its first end being accommodated in the third receptacle of the connection head, and its second end being open such that the interior of the third metal tube and the interior of the tank are connected. The open end resides close to the bottom of the tank. This tube may be employed to suck fluid out of the tube. The location of the open end facilitates to suck fluid out until the tank is empty.

With a fluid sensor according to the present invention, the base is provided with a further opening for accommodating one end of a further metal tube, and the tube supporting a sensor for measuring the fluid level in the tank. This tube contains a PCB and reed switches all along its length, and the reed switches interacting with a magnetic ring-shaped float, which is arranged at an outer surface of the tube. Thus, the float may be actuated by the fluid. Thereby, the fluid level is measured, and a corresponding signal can be sent to the CAN bus of the vehicle, for instance a truck.

The present invention also relates to a selective catalytic reduction (SCR) system for purification of harmful NOx components in the exhaust gases of diesel vehicles. In particular, the invention provides an SCR system having improved anchoring of the tubes in the connection head. In the prior art, this anchoring of a metal tube in the connection head is often achieved by means of a connector port attached to the metal tube, wherein the connector port comprises a thread. The connector port is then screwed into a respective receptacle of the base. However, a simplified geometry for cost reduction would be desirable.

Such a simplified geometry is chosen in the present invention where the thread is omitted. Rather, the connector port is fixed to the base by means of the grounding element comprising a metallic plate forming an open ring, which is fitted into a notch of the connector port. The metallic plate is fixed to the base via screws and connects the connector port with the grounding lead.

In particular, the present invention provides an SCR system wherein an outer surface of each connector port and the tube to which it is welded, each form a cylinder, the diameter of the tube to which the connector port is welded being smaller than the diameter of the connector port, and each connector port comprising a notch around its outer circumference, and wherein the first and second receptacles of the first and second grounding elements being formed as open rings engaging with said notches. The electrically conductive tubes comprise metal tubes which may each be welded to a connector port.

This simplifies the geometry of the connector port which no longer requires a thread. The metal plate may be fixed to the base via a plurality of screws. The new geometry without thread at the connector port but with a metal plate fixed to the base with a plurality of screws renders the assembly process simpler, compared to the conventional connector ports with threads. Before the system comprising the connection head and the tubes is installed in the vehicle, the openings of the tubes at the basis should be protected against dirt via plugs.

Furthermore, the connection head should be sealed when mounted in the opening of the tank to prevent an outflow of fluid. Therefore, the at least one connector port may exhibit a second notch around its circumference. The second notch resides between the first notch and the inner volume of the tank, wherein a sealing element, for instance an elastic O-ring, is fitted into the second notch. A further O-ring around the base may seal the interface between the base and the opening of the tank.

The connector ports may be used to connect the heating tube and the tubes for sucking fluid from the tank to the connection head, i.e., the tubes which are associated with fluid flow into the head connector.

Moreover, a plurality of flaps may be provided at the float stop; the flaps extending away from the first end of the tube, perpendicular to the axis of the cylinder, and the flaps being fixed to the base of the connection head. The fixation may be accomplished via screws.

According to an embodiment of the present invention a connection head is provided for being arranged in an orifice of a fluid tank, the connection head comprising an electrically insulating base, wherein the base is provided with at least a first opening for receiving a tube, and a return cavity integrated with the connection head. Preferably, the return cavity is terminating at an opening on a peripheral, e.g., curved, surface of the connection head.

Advantageously, according to another embodiment of the present invention, the connection head may be extruded to form a radial duct terminating at the return cavity.

Advantageously, according to another embodiment of the present invention, the radial duct is slanted along an axial direction.

Advantageously, according to another embodiment of the present invention, the tube received in the connection head is electrically conductive.

Advantageously, according to another embodiment of the present invention, the connection head comprises at least a first electrically conductive grounding element with at least a first receptacle, wherein the first electrically conductive grounding element is arranged such that the first electrically conductive tube is electrically connected to the first grounding element.

Advantageously, according to another embodiment of the present invention, the first receptacle of the first grounding element is aligned with the first opening of the base to encompass said conductive tube.

Advantageously, according to another embodiment of the present invention, the first and/or the second grounding element comprise a metal plate.

Advantageously, according to another embodiment of the present invention, the metal plate is fixed to the base by at least one screw. Advantageously, according to another embodiment of the present invention, the base further comprises an electrical connector for electrically contacting at least one fluid sensor assembly.

Advantageously, according to another embodiment of the present invention, provided is a fluid sensor comprising a connection head according to advantageous embodiments of the present invention. The fluid sensor further comprises at least one fluid quality sensor unit which is distanced apart from the connection head for being arranged inside the fluid tank.

Advantageously, according to another embodiment of the present invention, the fluid sensor further comprises a fluid level sensor.

Advantageously, according to another embodiment of the present invention provided is a selective catalytic reduction (SCR) system for purification of harmful NOx components in the exhaust gases of diesel vehicles with a urea tank and a fluid sensor according advantageous embodiments of the present invention and installed in the urea tank for measuring one or several properties of the urea solution in the tank.

In the following, the invention is described in more detail in reference to the attached figures and drawings. Similar or corresponding details in the figures are marked with the same reference numerals.

The accompanying drawings are incorporated into the specification and form a part of the specification to illustrate several embodiments of the present invention. These drawings, together with the description, serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. The following described embodiments can thus be considered either alone or in an arbitrary combination thereof. The described embodiments are merely possible configurations, and it must be borne in mind that the individual features as described above can be provided independently of one another, or can be omitted altogether while implementing this invention. Further features and advantages will become apparent from the following more particular description of the various embodiments of the invention as illustrated in the accompanying drawings in which like references refer to like elements.

DETAILED DESCRIPTION

Figure 1:
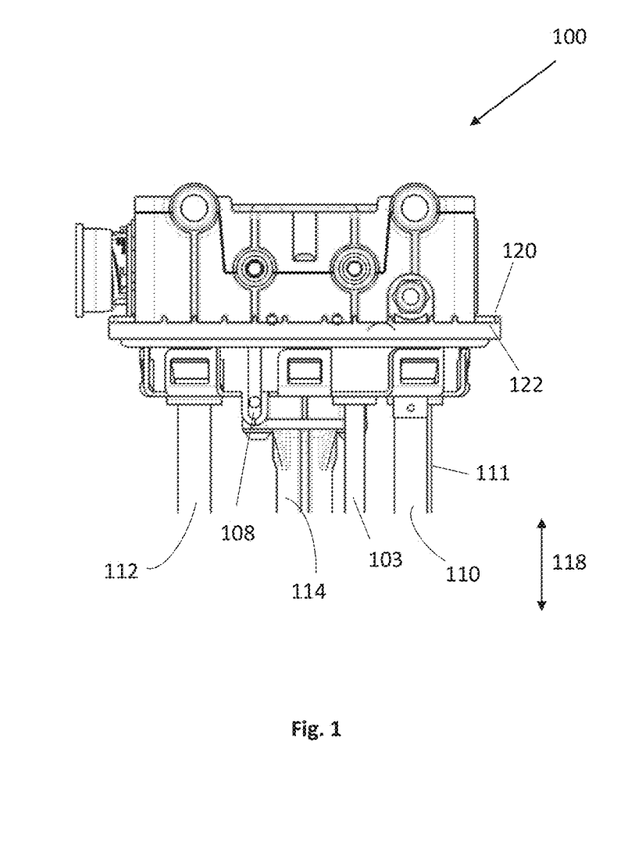
FIG. 1 shows a cross-sectional view of a connection head according to an embodiment of the present invention.

In the following, the Figures are described in detail, first referring to FIG. 1. FIG. 1 shows a perspective view of a connection head 100 of a urea sensor according to the present invention. The urea sensor is part of an SCR system, and can be mounted at an orifice in the wall of a urea tank (not shown in the figure).

The connection head 100 which is attached to the urea tank and a sensor unit (not shown in the figure), which is arranged distanced apart from the connection head 100 and extends into the tank. The sensor unit comprises a module for measuring fluid properties like temperature, urea concentration and fluid quality.

According to an embodiment of the present invention, a return cavity 108 is integrated in the connection head 100, which feeds back unused urea solution into the tank. A suction tube 110 allows for retrieving the urea solution out of the tank. Furthermore, a heating coil 112 is provided for heating the urea solution in the vicinity of the sensor unit, and the suction tube 110 in order to avoid freezing of, or thaw of already frozen urea solution. The suction tube 110 for sucking fluid out of the tank 102 is fixed to the heating coil 112 via grounding elements 128, in order to warrant that the fluid which is sucked out has the right temperature for operation. Of course, the clamps may also be fabricated from a plastic material. The return cavity 108 according to this embodiment is configured in the form of a duct arranged in the connection head. It is to be noted that the return cavity 108 according to this invention is not limited to a duct-shaped form. Alternative variations of the return cavity are envisaged in other embodiments of the present invention.

A support tube 114 accommodates a series of reed relays (not visible in the figures) and allows a float (not shown in the figure) to slide along the direction 118. The float comprises a magnetic element so that the reed relays are actuated by the movement of the float along the support tube 114, thereby providing a signal indicative of the level of the urea solution in the tank.

The connection head 100 comprises a base 120, which is fabricated from an electrically insulating material. The base 120 is mounted at the urea tank by means of bulges 122 on its peripheral rim, wherein the bulges 122 are configured to fit with corresponding notches (not shown in the Figures) in the opening of the tank, ensuring the correct azimuthal orientation of the connection head 100 once it resides in the opening of the tank. The support tube 114 is mechanically stabilized and fixed to the base 120.

Figure 2:
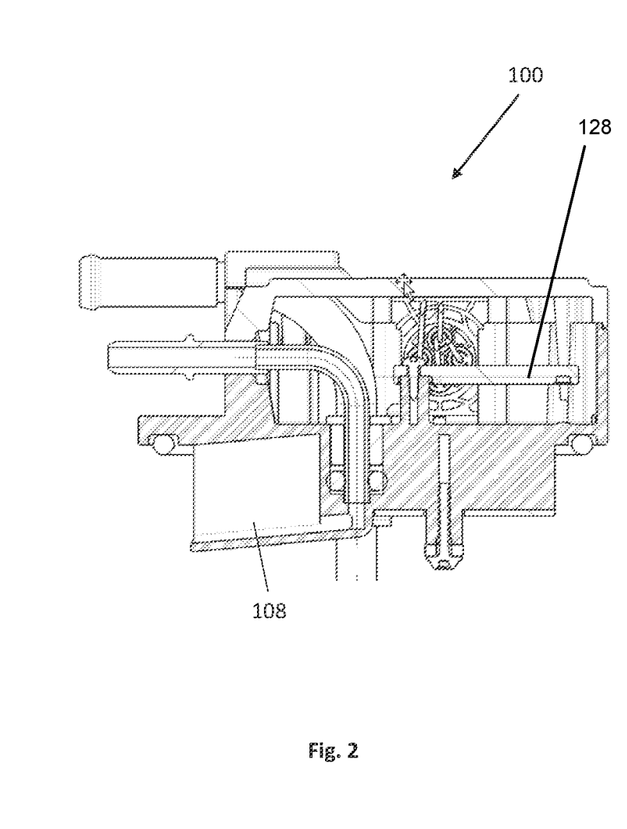
FIG. 2 shows a perspective view of a connection head according to an embodiment of the present invention.

FIG. 2 shows a detailed cross-sectional side view of the connection head 100 according to the above embodiment as depicted in FIG. 1. As can be seen from this drawing, the return cavity 108 has essentially a shape of a radial duct at an opening on a curved surface of the connection head 100. As will be apparent in more detail from FIG. 3, the return cavity 108 is formed by extruding the base of the connection head as can been seen from a detailed view of the base of the connection head. Extruding the base 120 is not the only method of forming the return cavity 108. It may also be formed by the pressing the base 120 or attaching an external component to the base 120. Moreover, as can be seen from FIG. 3 the base 120 is closed from a side facing the urea tank 102 by means of a lid 134 that is attached to the base 120 by means of a plurality of resilient latches 136, which interact with corresponding locking protrusions 138.

Figure 3:
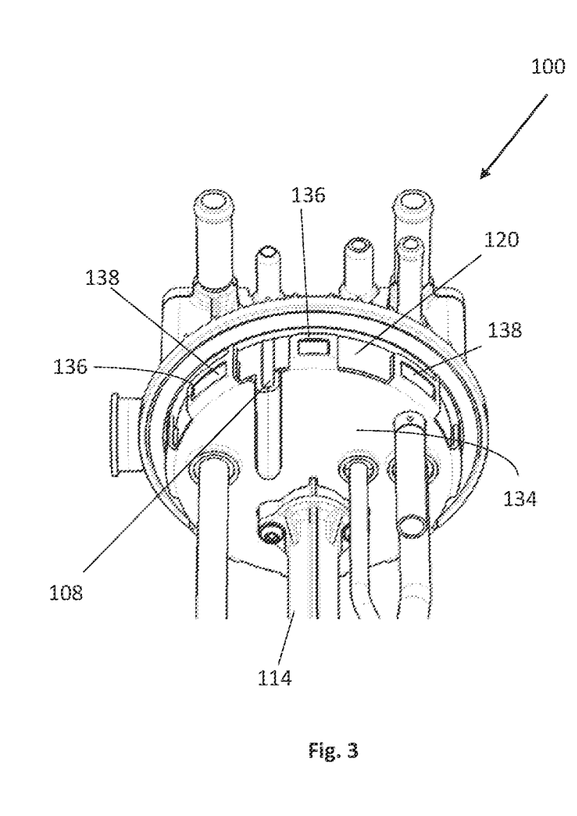
FIG. 3 shows a bottom view of the connection head according to FIG. 1.
Figure 4:
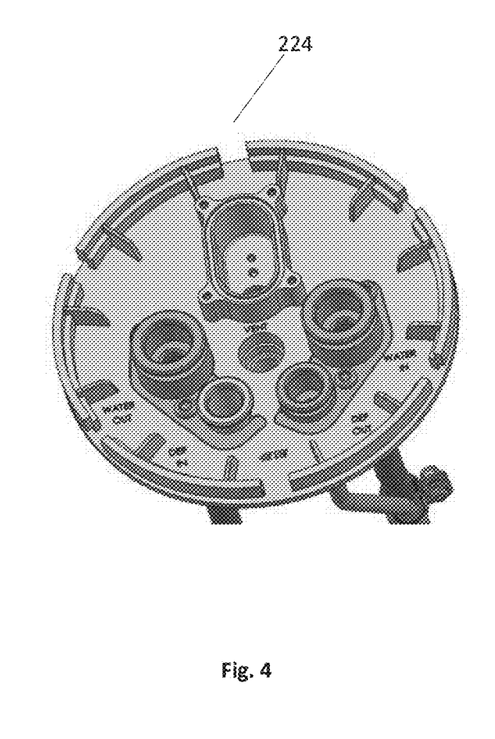
FIG. 4 shows a schematic perspective representation of a detail of the connection head according to an embodiment of the present invention.
Figure 5:
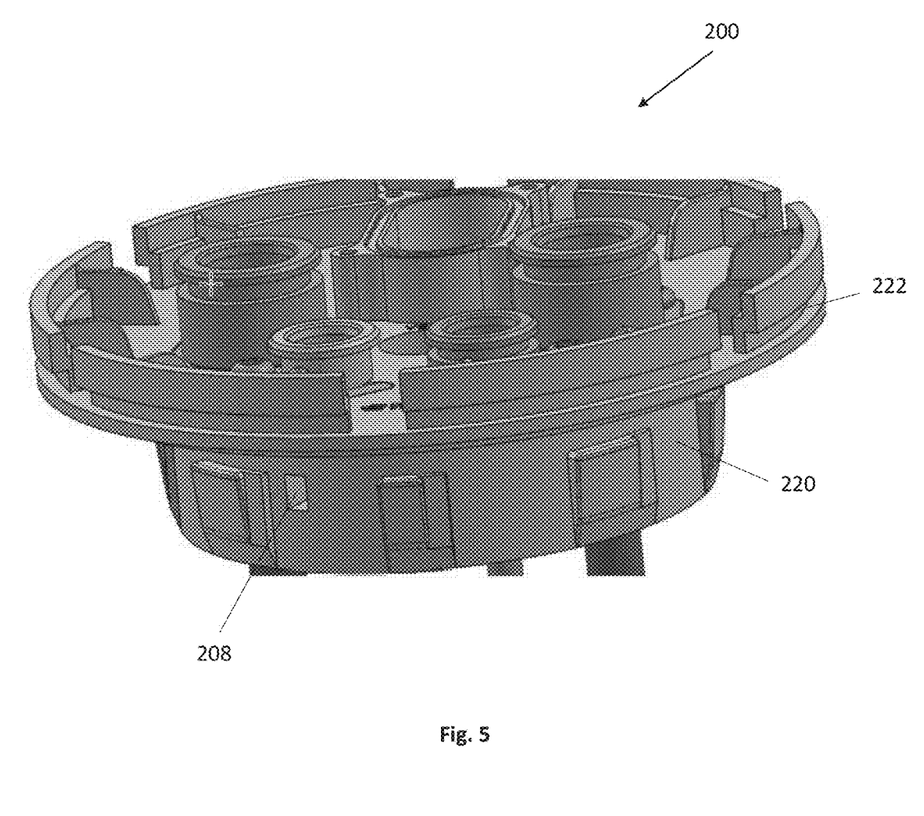
FIG. 5 shows a top view of the connection head according to the embodiment of FIG. 4.

FIGS. 4 and 5 show perspective views of a connection head 200, wherein an inner structure of the connection head is presented. Only differences to the previous embodiment as shown in FIGS. 1 to 3 is described in the following. Otherwise, full reference is made to the preceding text.

The return cavity according to this embodiment is presented in the form of a direct opening in the connection head.

Figure 6A:
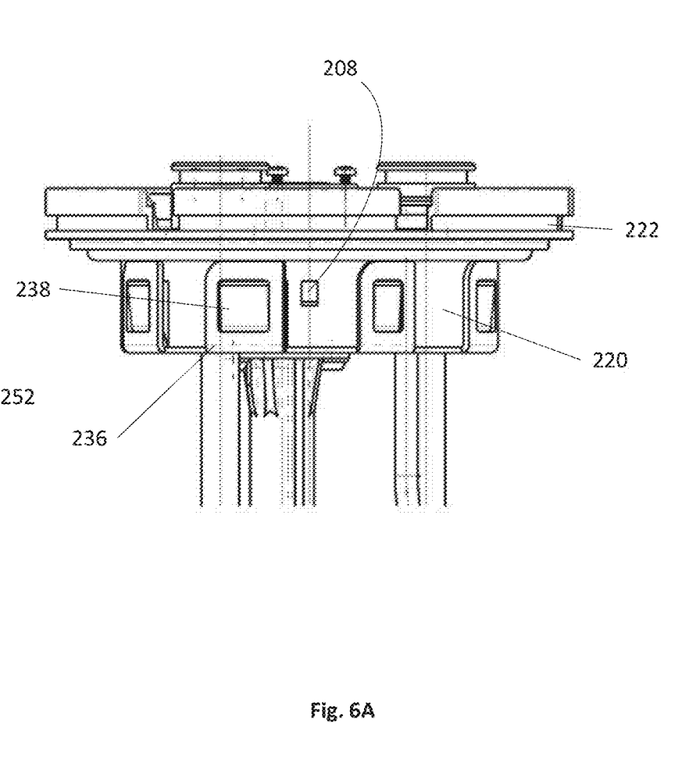
FIG. 6A shows another sectional view of the connection head according to FIG. 5.
Figure 6B:
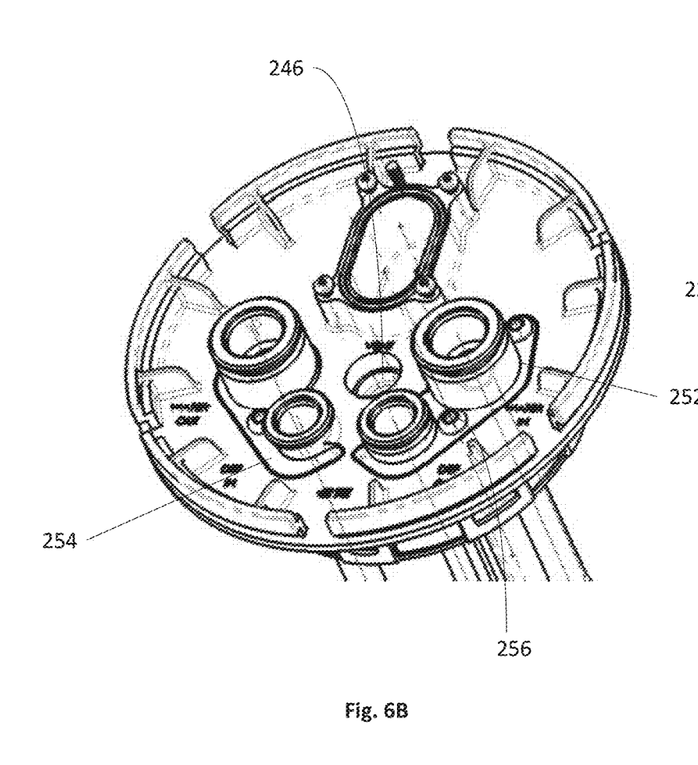
FIG. 6B shows another top view of the connection head according to FIG. 5.

FIGS. 6A and 6B show the connection head 200 of FIGS. 4 and 5 from the top. A venting element 246 (as shown in FIG. 6B) is provided for pressure equalization. The respective tubes are electrically conductive and are connected to a first and a second grounding element 252, 254, respectively. Each of the grounding elements 252, 254 is attached to the base 220 by means of a plurality of screws 256. According to the embodiment shown in FIG. 6B, each of the grounding elements are attached with three screws 256. However, it is clear that also only two screws or four or more screws could be used for fixing the grounding elements 252, 254. Because the first and second grounding elements 252 and 254 do not completely surround the respective tubes, but form a partly open receptacle, there is sufficient resiliency for allowing a snap-fit mounting of the tubes.

Figure 7:
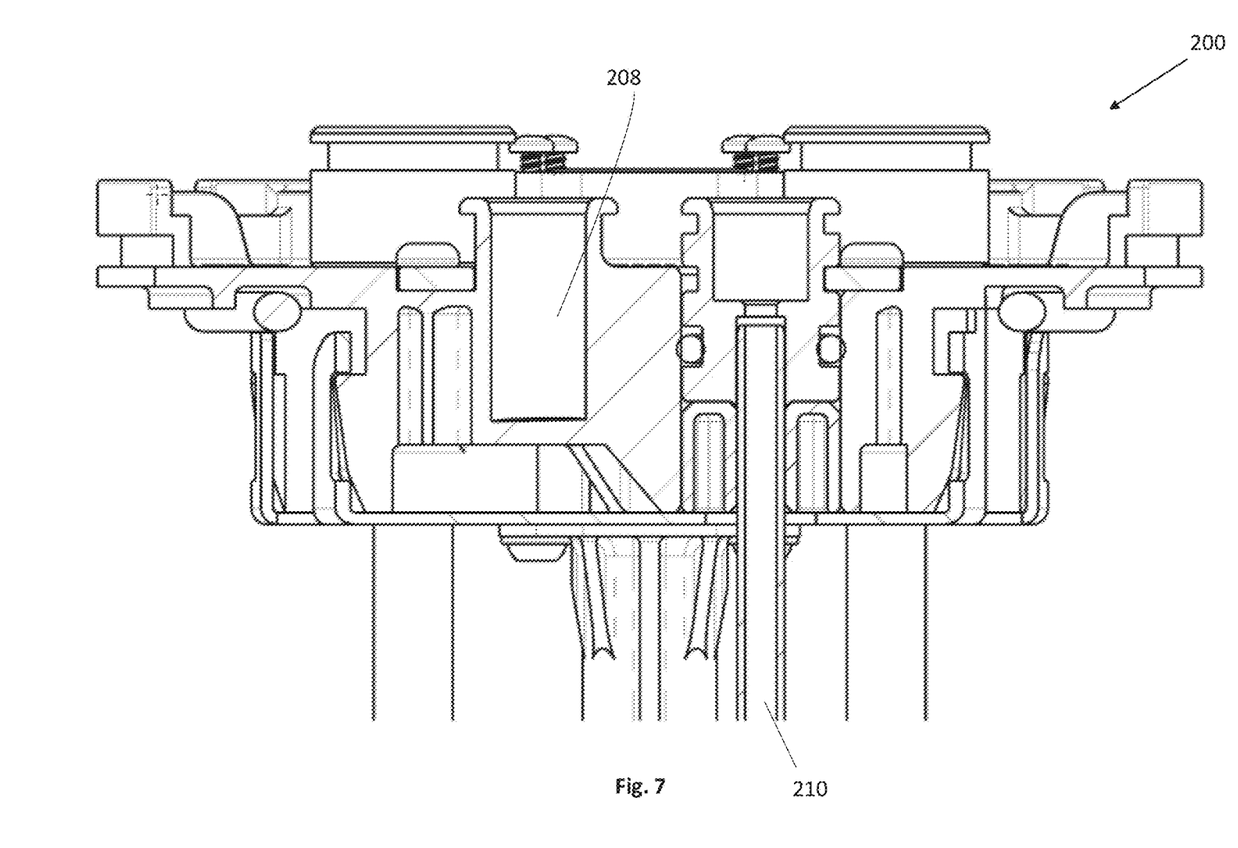
FIG. 7 shows an enlarged cross-sectional view of the connection head according to FIG. 5.

FIG. 7 shows a zoomed view of the connection head 200 according to the embodiment where the return cavity 208 is a direct opening in the connection head, and also shows the suction tube 210.

Figure 8:
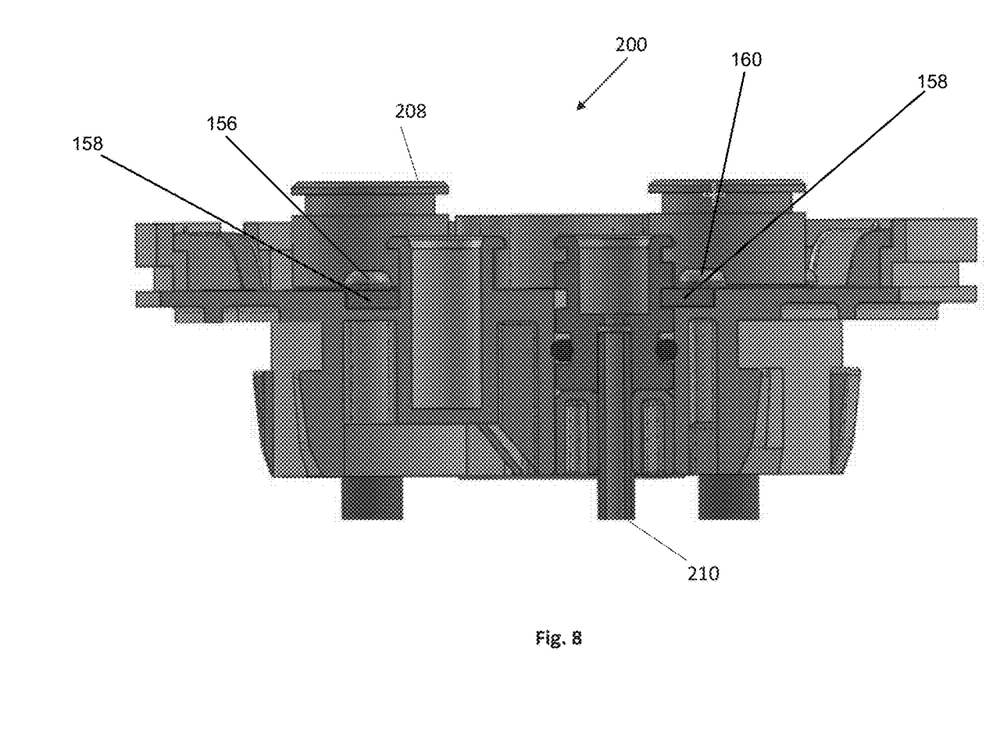
FIG. 8 shows another sectional view of the connection head according to FIG. 7.
Figure 9:
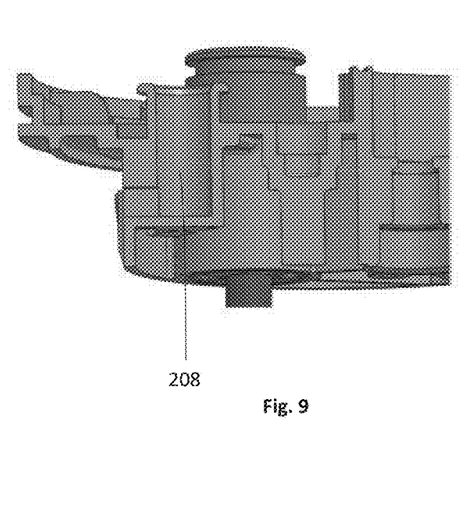
FIG. 9 shows a zoomed view of the connection head with a return cavity according to FIG. 7.

FIGS. 8 and 9 show a detail of the connection head 200 without showing the insulating tubes. In this open representation, it is visible that the return cavity is completely different in design and functionality compared to the suction tube. According to the present invention, the first and second grounding leads 158 are over molded by the electrically insulating material of the base, and are only laid open in the contact regions for the screws 156 and 160.

Figure 10:
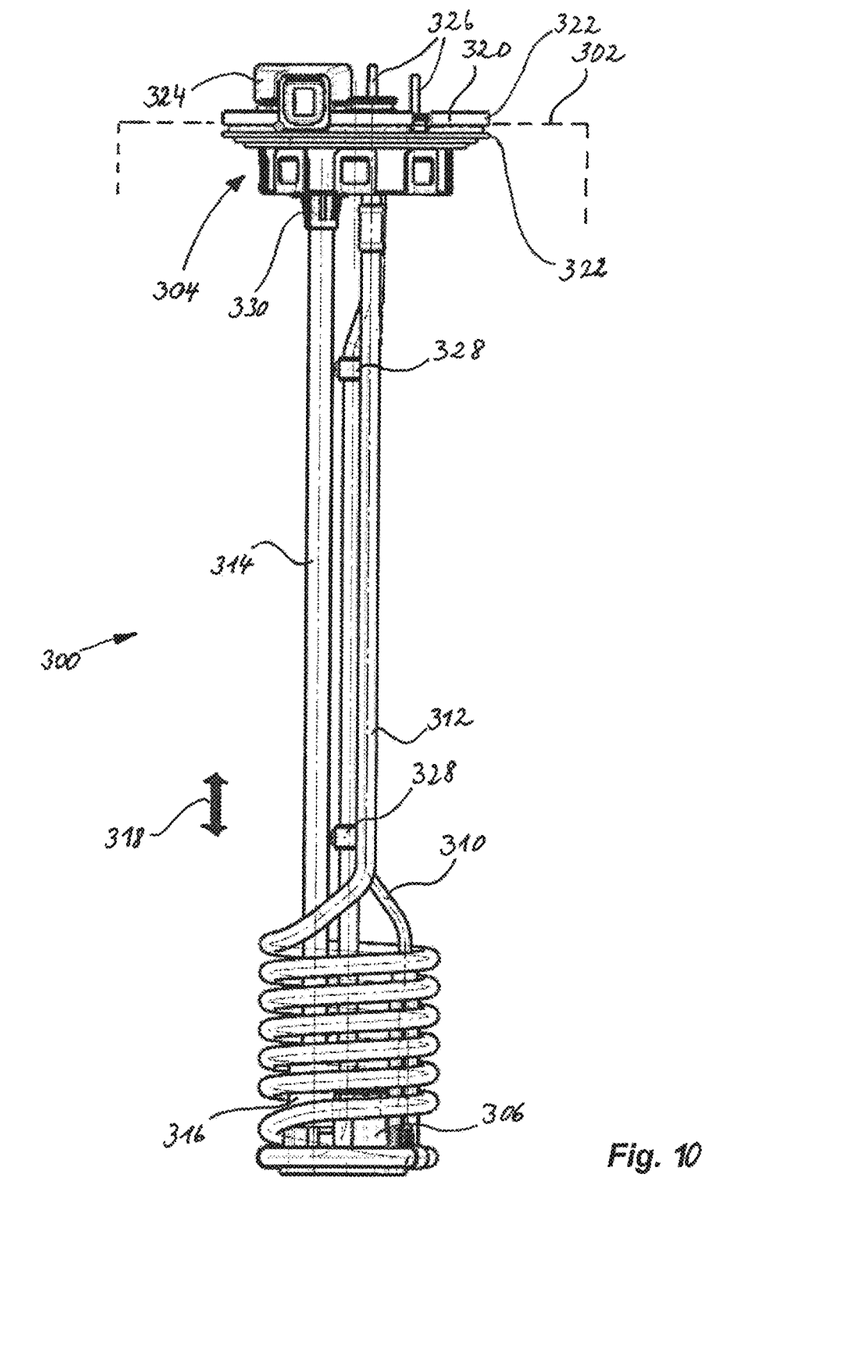
FIG. 10 shows a perspective view of a fluid sensor according to an embodiment of the present invention.

FIG. 10 shows a perspective view of a urea sensor 300 according to the present invention. The urea sensor is part of an SCR system and can be mounted at an orifice in the wall of a urea tank 302. The urea sensor 300 comprises a connection head 304 which is attached to the urea tank 302 and a sensor unit 306 which is arranged distanced apart from the connection head 304 and extends into the tank 302. The connection head 304 may be formed according to one of the embodiments explained above with reference to FIGS. 1 to 9.

The sensor unit 306 comprises a module for measuring fluid properties like temperature and urea concentration and fluid quality.

A return cavity (not visible in this drawing) formed in the connection head 304 feeds back unused urea solution into the tank 302. A suction tube 310 allows retrieving urea solution out of the tank 302. Furthermore, a heating coil 312 is provided for heating the urea solution in the vicinity of the sensor unit 306 and the suction tube 310 in order to avoid freezing of or thaw already frozen urea solution. The suction tube 310 for sucking fluid out of the tank 302 is fixed to the heating coil 312 via grounding elements 328, in order to warrant that the fluid which is sucked out has the right temperature for operation. Of course, the clamps 328 may also be fabricated from a plastic material.

A support tube 314 accommodates a series of reed relays (not visible in the figures) and allows a float 316 to slide along the direction 318. The float 316 comprises a magnetic element so that the reed relays are actuated by the movement of the float 316 along the support tube 314, thereby providing a signal indicative of the level of the urea solution in the tank 302.

The connection head 304 comprises a base 320 which is fabricated from an electrically insulating material. The base 320 is mounted at the urea tank 302 by means of bulges 322 on its peripheral rim, the bulges 322 fitting to corresponding notches (not shown in the Figures) in the opening of the tank 302, ensuring the correct azimuthal orientation of the connection head 304 once it resides in the opening of the tank 302.

On top of the base 320, a cover 324 is provided for protecting a power line, a grounding line, and a CAN bus. An electrical connector (not shown in the drawings) which is attached to the wiring system of the vehicle, for instance a truck, can be connected to the cover. Next to the cover 324, the protective plugs 326 for the protection of the tube openings against dirt can be seen. These protective plugs 326 are removed before the tubing from the vehicle is attached.

The support tube 314 is mechanically stabilized and fixed to the base 320 by means of a float stop 330.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "proximal", "distal", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations), and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

While the present disclosure has been particularly shown and described with reference to exemplary embodiments thereof, it will be understood by those skilled in the art that various changes in form and details may be made therein without departing from the intent of the disclosure as defined by the appended claims. The exemplary embodiments should be considered in a descriptive sense only, and not for purposes of limitation. Therefore, the scope of the present disclosure is defined not by the above description of the

REFERENCE NUMERALS

| Reference Numeral | Description |
| --- | --- |
| 100, 200 | Connection head |
| 102 | tank |
| 108 | Return cavity, radial duct |
| 110 | Suction tube |
| 112 | Heating coil |
| 114 | Support tube |
| 118 | Sliding direction of float |
| 120 | Base |
| 122 | Bulge |
| 134 | Lid |
| 136 | Resilient latch |
| 138 | Locking protrusion |
| 146 | Venting element |
| 148 | Inlet of heating fluid |
| 150 | Outlet of heating fluid |
| 252 | First grounding element |
| 254 | Second grounding element |
| 256 | Fixing screw |
| 258 | First and second grounding lead |
| 160 | Grounding screw |
| 300 | Urea sensor |
| 302 | Tank |
| 304 | Connection head |
| 306 | Sensor unit |
| 310 | Suction tube |
| 312 | Heating coil |
| 314 | Support tube |
| 316 | Float |
| 318 | Sliding direction |
| 320 | Base |
| 322 | Bulges |
| 324 | Cover |
| 326 | Protective plug |
| 328 | Clamp |
| 330 | Float stop |

What is claimed is:

1. A connection head for being arranged in an orifice of a fluid tank, the connection head comprising:
an electrically insulating base, wherein the base is provided with at least a first opening for receiving a tube, wherein the tube comprises a first electrically conductive tube, and wherein the connection head further comprises at least a first electrically conductive grounding element with at least a first receptacle, wherein the first electrically conductive grounding element is arranged such that the first electrically conductive tube is electrically connected to the first electrically conductive grounding element; and
a return cavity integrated in the connection head.

2. The connection head according to claim 1, wherein the base of the connection head is extruded to form a radial duct terminating at the return cavity.

3. The connection head according to claim 2, wherein the radial duct is slanted along an axial direction.

4. The connection head according to claim 1, wherein the return cavity terminates at an opening on a peripheral surface of the connection head.

5. The connection head according to claim 1, wherein the first receptacle of the first electrically conductive grounding element is aligned with a first opening of the base to encompass the first electrically conductive tube.

6. The connection head according to claim 1, wherein the first electrically conductive grounding element comprises a metal plate.

7. The connection head according to claim 6, wherein the metal plate is fixed to the base by at least one screw.

8. A connection head configured for attachment with an orifice of a fluid tank, the connection head comprising:
a base formed from an electrically insulating material, wherein the base comprises:
at least a first opening for receiving a first electrically conductive tube;
a first electrically conductive grounding element that is electrically connected to the first electrically conductive tube, wherein the first electrically conductive grounding element is electrically connected with a first region of a first grounding lead, and wherein a second region of the first grounding lead is connectable to a ground potential;
a return cavity integrated in the connection head comprising a direct opening on a peripheral surface of the connection head.

9. The connection head according to claim 8, wherein the first grounding lead is at least partially surrounded by the electrically insulating material.

10. The connection head according to claim 8, wherein the first electrically conductive grounding element comprises a first receptacle that is aligned with the first opening of the base to encompass the first electrically conductive tube.

11. The connection head according to claim 10, wherein the first receptacle comprises a metal plate, and wherein the metal plate is attached to the base.

12. The connection head according to claim 8, further comprising a suction tube that is connected with and extends to the base for transporting a fluid from the fluid tank to the connection head.

13. A connection head configured for attachment with an orifice of a fluid tank, the connection head comprising:
a base formed from an electrically insulating material, wherein the base comprises:
a first opening for receiving a first electrically conductive tube therein;
a first electrically conductive grounding element that is electrically connected to the first electrically conductive tube, wherein the first electrically grounding element is electrically connected within the connection head with a first region of a first grounding lead, wherein the first grounding lead is at least partially surrounded by the electrically insulating material, and wherein a second region of the first grounding lead is connectable to a ground potential;
a support tube connected with the connection head and extending downwardly a distance therefrom; and
a return cavity integrated in the connection head comprising a direct opening on a peripheral surface of the connection head.

14. The connection head according to claim 13, further comprising a heating coil and a suction tube that each connect with the connection head and each extend downwardly a distance therefrom.

* * * * *